United States Patent [19]

Vollbrecht

[11] 4,355,253
[45] Oct. 19, 1982

[54] COMBINATION END BELL AND BRUSH HOLDER FOR A DYNAMOELECTRIC MACHINE

[75] Inventor: Kenneth A. Vollbrecht, Milwaukee, Wis.

[73] Assignee: Briggs & Stratton Corp., Wauwatosa, Wis.

[21] Appl. No.: 238,827

[22] Filed: Feb. 27, 1981

[51] Int. Cl.³ .............................................. H02K 13/00
[52] U.S. Cl. ...................................... 310/239; 310/43
[58] Field of Search ............ 310/42, 43, 40 MM, 238, 310/239, 242, 245, 247, 248, 249; 339/14 R

[56] References Cited

U.S. PATENT DOCUMENTS

| | | | |
|---|---|---|---|
| 3,387,155 | 1/1968 | Krulls | 310/245 |
| 3,617,786 | 11/1970 | Stielper | 310/242 |
| 3,723,942 | 3/1973 | Dennison | 339/14 R |
| 3,745,393 | 7/1973 | Spors | 310/239 |
| 4,112,321 | 9/1978 | Wan | 310/242 |

FOREIGN PATENT DOCUMENTS 2130430  3/1980  Fed. Rep. of Germany ...... 310/239

*Primary Examiner*—A. T. Grimley
*Assistant Examiner*—D. L. Rebsch
*Attorney, Agent, or Firm*—Andrus, Sceales, Starke & Sawall

[57] ABSTRACT

A one-piece end bell and brush holder for a dynamo-electric machine comprises a cup-shaped cap member molded of electrical insulating material. The cap member has a flat, annular base with its central opening accommodating the rotating shaft of the machine, and a circular outer wall shaped to have interfitting engagement with a cylindrical housing of the machine. Encircling the central opening is a circular inner wall that extends axially from the base a distance sufficient to encompass the commutator of the machine. The inner wall has four equispaced openings formed therein that permit brushes to move radially therethrough for engagement with the circumference of the commutator. The brushes are mounted in brush boxes, each of which includes a pair of side walls adjacent to and embracing the opening in the inner wall and extending radially outward from the inner wall to the outer wall. These side walls cooperate with inwardly facing flanges on the top edges thereof and with a radially extending stop member located between the side walls and along the bottom thereof to provide guideways in which the brushes are slidably received and contained. U-shaped terminals are positioned about the circumference of the base of the cap member to straddle its outer edge. Bolts pass through these terminals to fasten the cap member to the machine housing and provide grounded terminals for the brushes.

16 Claims, 6 Drawing Figures

COMBINATION END BELL AND BRUSH HOLDER FOR A DYNAMOELECTRIC MACHINE

BACKGROUND OF THE INVENTION

The present invention relates to dynamoelectric machines and more particularly to a one-piece end bell and brush holder for a dynamoelectric machine.

The brushes of a motor or generator that has a drum-like commutator are generally oriented in a radial direction about the circumference of the commutator and are biased inwardly against the commutator. Brushes are thus conventionally received within a brush holder for supporting and guiding the motor brushes to ensure their proper orientation and location. A separate end bell encloses the commutator end of the motor or generator and secures the brush holder in its proper position.

Various arrangements have been developed for mounting brushes. One such arrangement is shown in Spors, U.S. Pat. No. 3,745,393, which is assigned to the assignee of the present invention. The Spors patent discloses a two-piece brush holder that comprises a molded carrier having a plurality of brush receiving recesses formed therein and a stamped washer-like member to insulate the brushes from the motor housing. A separate end bell encloses the commutator end of the motor, and secures the brush holder in its proper position. Such an assembly, however, entails relatively high costs of fabrication and assembly due to the number of individual parts thereof. It is thus desirable to provide a unitary brush holder comprised of simple and inexpensive parts which can be economically manufactured and assembled.

Various unitary brush holders have also been developed. One such unitary structure is shown in Wan, U.S. Pat. No. 4,112,321, which discloses a molded plastic brush holder. The brush holder includes brush housings formed therein that provide channelways for supporting and guiding motor brushes. Each housing includes sidewalls having projecting ribs that engage with mating grooves formed in each brush, and a finger that extends from a rear wall along one of the open ends of the channel. The finger and ribs of each housing serve to prevent a biasing spring from falling through the open ends of the brush channel. Although the brush holder of Wan is molded in one piece, it would still be necessary to utilize a separate end bell to enclose this type of brush holder in a motor housing. There is therefore little, if any, cost advantage in utilizing such a brush holder.

Various problems in addition to cost are also associated with brush holder assemblies. One such problem involves the heat generated as a result of friction between the brushes and the rotating commutator. A brush holder assembly must provide for the dissipation of such heat to decrease brush wear and increase motor life. One solution is to construct the brush holders from a material which is a good conductor of heat. Another solution includes exposing the surface area of the brushes to the atmosphere. For example, in the aforesaid Wan patent two faces and the back side of each brush are exposed to the atmosphere. However, the two remaining faces of each brush are still substantially confined within and in contact with the side walls of the brush holding housings. It is, therefore, desirable to not only construct a brush holder from a material which is a good conductor of heat, but also to expose as much as possible of the surface area of each brush to the atmosphere to provide adequate heat dissipation.

Another problem associated with friction between the brushes and the rotating commutator is that of brush wear. Brush wear causes fine dust particles to develop within the assembly. Such dust may adhere to the brush terminals resulting in corrosion and an electrical connection of reduced efficiency.

Provision should also be made for ease of assembly. Brush lead wires or shunt wires connecting the brushes and terminals need to be located in such a position so as to avoid interference with the commutator when the brushes are assembled about the commutator. For example, the aforesaid Wan patent utilizes U-shaped members for retaining conductor wires, but does not provide for retaining the lead or shunt wires.

It is thus desirable to combine a brush holder with an end bell into a one-piece structure which would substantially reduce the problems relating to cost, heat, wear and assembly presented by prior brush holder assemblies.

SUMMARY OF THE INVENTION

The present invention provides a combined end bell and brush holder for a dynamoelectric machine that not only supports and guides the brushes of the machine, but also encloses the commutator end of the machine. The present invention thus provides substantial cost savings by being integrally molded of electrical insulating material in one-piece.

The combination end bell and brush holder of the present invention comprises an annular, cup-shaped cap member that includes a flat, annular base with its central opening accommodating the rotating shaft of the machine, and a circular outer wall shaped to have interfitting engagement with a cylindrical housing of the machine. The cap member also includes a plurality of circumferentially spaced apart and radially elongated brush mounting boxes for confining the brushes of the machine in the position for optimum commutation and performance for the machine. The brushes are preferably equispaced from one another. The brush mounting boxes, however, permit radial movement of the brushes relative to the commutator. Each mounting box includes a pair of opposing, spaced apart side walls, an end wall extending between the radially outer ends of the side walls, and a stop member located between the side walls and along the bottom thereof. The side walls include flanges on their top edges which project toward each other to form a radially extending slot along the top of each mounting box which accommodates the shunt wire of each brush and exposes the top face of each brush to the atmosphere. The side walls, flanges and stop member of each mounting box cooperate to provide guideways opening radially inwardly in which the brushes of the machine are lengthwise slidably received. Coiled compression springs bias each brush radially inwardly toward the commutator. These springs are confined in the channelways between each brush and its respective end wall. Thus, during operation the back of each brush is spaced from its end wall.

Each side wall of the mounting boxes preferably includes a vent opening formed therethrough. These vent openings expose a portion of the sides of the brushes to the atmosphere and aid in dissipating the heat from the brushes and commutator that developes during operation of the machine. The cap member also includes apertures formed through its base at the location of the brush mounting boxes which expose the bottom face of each brush to the atmosphere. The stop member of each brush box is preferably in the form of a strap or finger which is spaced from the side walls, and bridges its respective aperture to confine a brush within its brush box. Each stop member also positions its brush into its proper location within the brush box with respect to the commutator.

It can thus be seen that the present invention provides a brush box construction having improved capability for dissipating the heat that develops during operation of the dynamoelectric machine. Each face of the brushes, with the exception of the commutator-contacting face, is at least partially exposed to the atmosphere. This leads to decreased wear of the brushes and increased motor life.

In another aspect of the invention the cap member includes a circular inner wall that is concentric with its central opening and circular outer wall. The inner wall projects from the cap member a sufficient distance to encompass the commutator of the motor, and contains circumferentially spaced apart openings formed at locations in radial alignment with the brush boxes. The brush boxes open radially inwardly through these openings to permit the brushes to slidably engage the commutator. The inner wall is thus divided into segments which connect the side walls of adjacent brush mounting boxes. These segments concentrate the brush dust formed during the use and wear of the brushes in the center of the cap member and keep the terminals electrically isolated by preventing the brush dust from collecting on the terminals.

The side walls of each brush mounting box preferably extend radially between the inner wall and the outer wall of the cap member so that the outer wall serves as the end wall enclosing the radially outer ends of the side walls of the boxes. Each brush mounting box also preferably includes a notch formed in its radially outer end that accommodates the shunt wire or lead wire of each brush during assembly. These notches hold the shunt or lead wires away from the commutator during assembly.

In another aspect of the invention the outer wall of the cap member is interrupted at two radially opposite positions to permit U-shaped terminals to be mounted on the cap member about its outer edge. The cap member also includes radially extending enlargements coinciding with the interruptions of the outer wall which serve as a reinforcement and landing for the U-shaped terminals. These U-shaped terminals are the ground terminals for the brushes and are connected to the housing of the motor by means of a bolt which extends through aligned openings in the U-shaped terminals and landings. The outer wall of the cap member is preferably recessed from the outer edge of the base to permit interfitting engagement with the cylindrical housing of the motor. The cap member also includes a key member adapted to be received in a complementary key-receiving recess formed in the cylindrical housing to facilitate proper alignment and assembly of the cap member and the motor.

BRIEF DESCRIPTION OF THE DRAWINGS

The drawings furnished herewith illustrate a preferred construction of the present invention in which the above advantages and features are clearly disclosed as well as others which will be readily understood from the following description.

In the drawings.

DESCRIPTION OF THE PREFERRED EMBODIMENT

Figure 1:
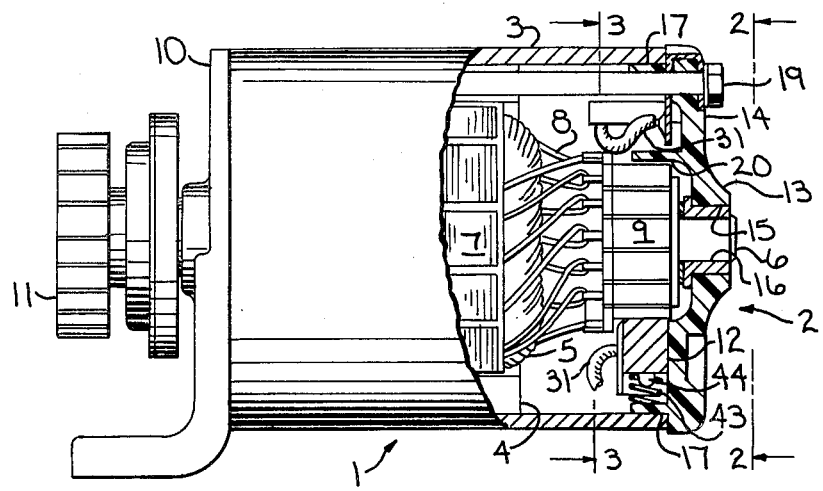
FIG. 1 is a side view in elevation with portions broken away and shown in section of an electric motor incorporating the one-piece end bell and brush holder of the present invention.

Referring now to the drawings, FIG. 1 shows a dynamoelectric machine 1 incorporating the combination end bell and brush holder 2 of the present invention. The dynamoelectric machine 1 is illustrated as a fractional horse power motor such as those used as a starting motor for a single cylinder four stroke gasoline engine.

The motor 1 has a substantially cylindrical housing 3 with permanent magnets 4 attached thereto, and a rotor or armature 5. The armature 5 includes a shaft 6 and a laminated core portion 7 concentrically secured to the shaft 6 and in which windings 8 are received. The windings 8 are connected to the segments of a drum-like commutator 9 which is secured to the shaft in axially spaced relation to the core portion 7. The shaft 6 of the armature 5 is journaled within an end closure 10 at the anti-commutator end of the motor and includes drive means, such as gear 11, located outside the closure 10 and housing 3 for connection to the gasoline engine.

The motor 1 described to this point may be considered conventional and known to those skilled in the art.

Figure 3:
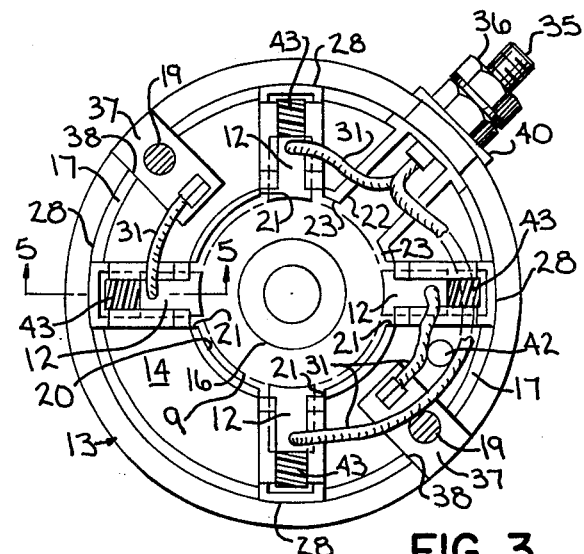
FIG. 3 is a view in section taken along the plane of the line 3—3 in FIG. 1.

As a unique feature, the motor 1 includes the combined end bell and brush holder 2 of the present invention for enclosing the commutator end of the motor 1, and for properly orientating and locating motor brushes 12 that engage the commutator 9. For purposes of illustration, the motor 1 is shown as having four brushes 12 circumferentially spaced around the commutator 9 with the angular relationship that results in the optimum for commutation and electrical performance of the dynamoelectric machine. As seen in FIG. 3, brushes 12 are preferably equispaced from one another and disposed 90° apart. However, it will be apparent to those skilled in the art that the principles of this invention apply equally to a dynamoelectric machine having any other number and arrangements of brushes.

The combined end bell and brush holder 2 includes an annular, cup-shaped cap member 13 molded in one-piece of electrical insulating material. The cap member 13 includes an annular, flat base 14 having a central opening 15 formed therethrough for receiving a bearing 16 that supports the shaft 6 of the motor 1 at its commutator end, and a circumferential outer wall 17 extending axially from the axially inner side of base 14 to be concentric with central opening 15. Bearing 16 may also be molded integrally in base 14, or the shaft 6 may run in direction contact with the insulating material of base 14 which is preferably formed of plastic. As seen best in FIGS. 4 and 5, outer wall 17 is recessed from the outer edge of base 14 to form a shoulder 18. This permits interfitting engagement with the cylindrical housing 3 of motor 1 so that, as seen in FIG. 1, the housing 3 embraces the circumferential outer wall 17 and the shoulder 18 engages the end of housing 3. The cap member 13 and end closure 10 are coaxially secured to opposite ends of the housing 3 by through bolts 19 and cooperate in providing an enclosure for the stator 4 and rotor or armature 5.

Cap member 13 also performs the function of holding the brushes 12 in directions generally radial to the axis of shaft 6 and in engagement with the circumference of commutator 9. Cap member 13 is preferably made of a thermosetting plastic, such as a glass filled polyester resin, and as shown in the drawings and as will hereinafter be described, can be molded in one-piece because the nature of its construction is such that no component overlies another component. Thus, the two parts of a molding die can be separated from each other, and there is no need to use more expensive molding techniques.

Cap member 13 includes a circular inner wall 20 extending axially from the base 14 a distance sufficient to substantially embrace the commutator 9 of motor 1. Inner wall 20 encircles the central opening 15 and is concentric with opening 15 and circular outer wall 17. Inner wall 20 has four openings 21 formed therein that are positioned for optimum commutation and electrical performance of the dynamoelectric machine. Openings 21 are preferably equispaced from one another and disposed 90° apart. The openings 21 permit the brushes 12 to move radially therethrough for engagement with the circumference of commutator 9. Inner wall 20 is thus divided into four separate segments and these segments concentrate the brush dust formed during use of the motor 1 from wear of the brushes 12 in the center of cap member 13 to keep the terminals of motor 1 relatively clean and electrically isolated.

Figure 4:
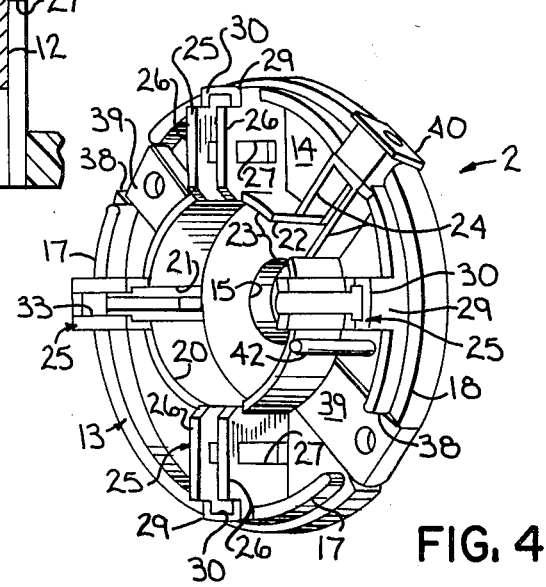
FIG. 4 is a view in perspective of the molded cap member constituting the one-piece end bell and brush holder of the present invention.

There is also a fifth opening 22 formed in one of the segments of inner wall 20 which provides for ease in assembling the brushes 12 in cap member 13, as will hereinafter be described. FIGS. 3 and 4 show that the opening 22 divides the one segment of inner wall 20 into two separate portions 23 which are supported by a pair of strengthening walls 24 which extend radially between the portions 23 and the outer wall 17.

Figures 5, 6:
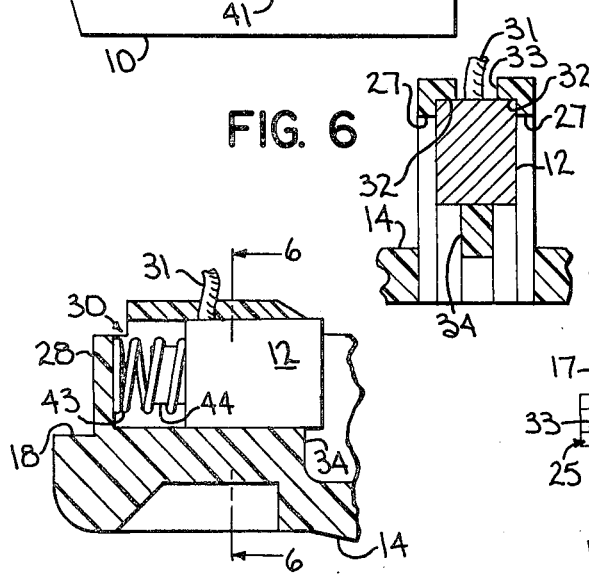
FIG. 5 is a view in section taken along the plane of the line 5—5 in FIG. 3.
FIG. 6 is a view in section taken along the plane of the line 6—6 in FIG. 5.

As seen in FIGS. 3 and 4, the cap member 13 has four circumferentially spaced apart radially elongated mounting boxes 25 for slidably confining the brushes 12 of motor 1. Each brush mounting box 25 is disposed on the axially inner side of base 14 and is substantially open at axially opposite ends thereof to aid in dissipating heat, as will hereinafter be described. Brush mounting boxes 25 are spaced at the optimum position for maximum electrical performance and commutation. As seen in FIG. 3, the boxes 25 are preferably equispaced from one another and disposed 90° apart. Each box 25 includes a pair of opposing, parallel spaced apart side walls 26 located adjacent to and embracing its respective opening 21 in inner wall 20. Side walls 26 extend radially along the axial inner side of base 14 from inner wall 20 to outer wall 17, and extend axially therefrom a sufficient distance to contain a brush 12 against circumferential displacement. Preferably, each side wall 26 includes a vent opening 27 formed therethrough. These vent openings 27 expose a portion of the sides of brushes 12 to the atmosphere, and aid in dissipating heat therefrom that normally develops during operation of motor 1. Also, that part of the mold core which forms the side vents 27 bears against another core section in order to maintain close control of the interior wall to wall dimensions of the brush boxes 25. This control is important for obtaining good brush life and maintaining commutator wear. As seen in FIGS. 4-6, each mounting box 25, as defined by the pair of side walls 26, is substantially open along its top and bottom. The top of each box 25, as seen in FIGS. 5 and 6, is its axially outer end while the bottom of each box 25 is its axially inner end which is at or near the point where the side walls 26 meet the base 14 of cap member 13. Since the top and bottom of each box 25 is substantially open, the top and bottom faces of each brush 12 are at least partially exposed to the atmosphere to aid in dissipating heat.

Each brush mounting box 25 also includes an end wall 28 extending between the radially outer ends of side walls 26. Since side walls 26 extend radially between the inner wall 12 and outer wall 17, end wall 28 is preferably formed by outer wall 17. However, it will be obvious to those skilled in the art that side walls 26 need not be integral with the outer wall 17 and in such an embodiment end wall 28 may comprise a separate structural component from outer wall 17. It can also be seen in FIG. 4 that side walls 26 of brush mounting boxes 25 extend axially from the axially inner side of base 14 further than outer wall 17 extends from base 14. As a result, end wall 28 of each box 25 includes a projection 29 integrally formed on outer wall 17 and extending axially therefrom to enclose the radially outer ends of side walls 26. As seen best in FIGS. 4 and 5, each brush mounting box 25 also includes a notch 30 formed at the radially outer ends of side walls 26 and the axially outer end of end wall 28. As seen in FIG. 3, these notches 30 are used to hold lead wires or shunt wires 31 for the brushes 12 during assembly.

Flanges 32 on the top or axially outer edges of side walls 26 project circumferentially toward each other to partially close the opening along the top of each brush mounting box 25 and to form a radially extending slot 33. Flanges 32 contain a brush 12 against axially inward movement, and slot 33 provides an opening through which a brush lead wire or shunt wire 31 connects with a brush 12. As shown, slot 33 extends the entire radial length of side walls 26 from the opening 21 in inner wall 20 to the notch 30, and substantially exposes the top surface of a brush 12 to the atmosphere to aid in dissipating heat.

As seen best in FIGS. 5 and 6, each brush mounting box 25 also includes a radially extending, elongated stop member 34 located between side walls 26 and extending along the opening formed in base 14 in the bottom of each mounting box 25 to contain a brush 12 against axial movement in that direction. Stop member 34 is preferably in the form of a strap or finger which is spaced from both side walls 26. Each stop member 34 also bridges its respective opening in base 14 to confine a brush 12 within brush box 25. Stop member 34 also positions a brush 12 into its proper location within the brush box 22 with respect to the commutator 9.

As particularly illustrated in FIG. 6, the side walls 26, flanges 32 and stop member 34 of each mounting box 25 cooperate to provide guideways opening radially inwardly through openings 21 in inner wall 20 in which the brushes 12 of motor 1 are lengthwise slidably received. FIG. 3 also shows the ungrounded terminal of motor 1 as comprising a bolt 35 which extends radially through outer wall 17. The inner end of bolt 35 provides for the connection of brush lead wires or shunt wires 31 to it which lead to diametrically opposite ungrounded brushes 12. A lock nut 36 holds bolt 35 in place with its shank portion projecting radially outwardly from cap member 13 to serve as an electrical supply lead terminal.

FIG. 3 also illustrates a pair of grounded terminals 37 for motor 1 which comprise U-shaped members positioned diametrically opposite one another about the circumference of base 14 of cap member 13 so that each terminal 37 is disposed between a pair of adjacent brush mounting boxes 25. As seen best in FIG. 1, each U-shaped terminal 37 has a pair of legs that straddle the outer edge of base 14 of cap member 13. To permit the legs of the U-shaped terminals 37 to straddle the outer edge of base 14, outer wall 17 of cap member 13 is interrupted as at 38 at diametrically opposite positions corresponding to the locations of terminals 37. To reinforce the legs of terminals 37, cap member 13 has radially extending lands 39 on the axially inner surface of base 14. Lands 39 extend radially from inner wall 20 through the interruptions 38 in outer wall 17 to the outer edge of base 14. As previously noted, end closure 10 and cap member 13 are secured to motor housing 3 by through bolts 19. As seen in FIGS. 1 and 4, these bolts 19 extend through axially aligned bores in lands 39 and the legs of the U-shaped terminals 37. The bolts 19 contact both the terminals 37 and the motor housing 3 to provide a ground for terminals 37 and a pair of diametrically opposite brushes 12, as seen in FIG. 3.

As seen best in FIG. 4, cap member 13 also includes means for facilitating its proper alignment during its assembly on the commutator end of motor housing 3. This alignment means comprises a key member 40 in the form of a rectangular shaped flange extending from the outer edge of base 14 in radial alignment with opening 22 in inner wall 20. Key member 40 has a radial opening formed therethrough for receiving the ungrounded terminal bolt 35 as will hereinafter be described. Key member 40 is adapted to be received in a complementary key-receiving recess (not shown) in the commutator end of motor housing 3. Thus, key member 40 facilitates assembly by properly aligning cap member 13 with respect to motor housing 3 and by preventing cap member 13 from rotating after being positioned thereon prior to insertion of through bolts 19.

Figure 2:
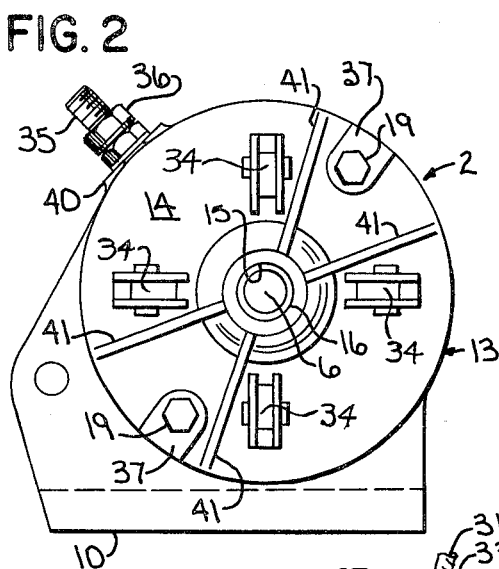
FIG. 2 is an end view taken along the plane of the line 2—2 in FIG. 1.

As seen in FIG. 2, radially elongaged ribs 41 are molded into the axially outer surface of cap member 13 to provide added dimensional stability for the base 14. As seen in FIG. 4, a post 42 projects from the axially inner surface of base 14 adjacent one of the lands 40. The post 42 aids in holding the long shunt wire 28 leading from the ungrounded terminal 35 away from the commutator 9 of motor 1 during assembly and operation of the dynamoelectric machine, as seen in FIG. 3.

As seen in FIGS. 3 and 5, each brush 12 is substantially rectangular in cross section with their longer dimension extending radially with respect to commutator 9. Each brush 12 is biased radially inwardly to engage the circumference of commutator 9 by means of coiled compression spring 43. Each spring 43 is confined in the channelway of each brush mounting box 25 between the back end of a brush 12 and its respective end wall 28. To prevent undesired shifting of the springs 43, each brush 12 has at its radially outer or back end an integral boss 44 upon which the radially inner end of its respective spring 43 is piloted, and the inner surface of end wall 28 is substantially square to provide a seat for the radially outer end of spring 43. Thus, as seen in FIG. 3, when assembled the back of each brush 12 is spaced from its respective end wall 28, and is radially slidable within the channelways of the boxes 25.

It is readily apparent that the one-piece end bell and brush holder of the present invention is assembled by inserting the two U-shaped terminals 37 about the outer edge of base 14 of cap member 13 at the position of the lands 39 with a brush 12 and a lead wire 31 connected to the axially inner leg of each terminal 37. The ungrounded terminal bolt 35 is then inserted through opening 22 in inner wall 20 and key member 40 with the two ungrounded brushes 12 and their wire leads 31 connected to it and then held in position by turning down nut 36. Brush springs 43 are assembled to integral bosses 44, and then the brushes and spring assemblies are slid into the channelways through openings 21 in inner wall 20, all from the center of cap member 13. Lead wires 31 are then positioned in the notches 30 formed in the back of mounting boxes 25 and the long lead wire 31 from the ungrounded terminal bolt 35 is positioned on the radially outer side of post 42. Cap member 13 with its brushes 12 now positioned within their mounting boxes 25, can then be assembled with motor housing 3 by aligning key member 40 with its corresponding key-receiving recess in housing 3. Through bolts 19 may then be inserted through the aligned openings in the legs of terminals 37 and lands 39 to secure cap member 13 on the commutator end of motor housing 3, and end closure 10 on the anti-commutator end of housing 3.

A combined end bell and brush holder for a dynamoelectric machine has been shown and described herein. The present invention provides substantial cost savings in that the combined end bell and brush holder is integrally molded of an electrical insulating material in one-piece. It is readily apparent to those skilled in the art, however, that the present invention can be embodied in forms other than those specifically described herein. For example, the stop member need not necessarily extend the entire radial length of the brush mounting boxes, but only need to extend a sufficient distance to provide a guideway for a brush and to contain a brush against axial movement. Further, the stop member need not be spaced from both side walls, but instead may project from the bottom of one or the other side wall. Also there need not necessarily be two flanges at the top of each brush. A single flange projecting from the top edge of one of the side walls would be sufficient to guide a brush radially and contain the brush against axial movement and yet provide sufficient exposure of the brush to the atmosphere for heat dissipation. The vent openings provided in the side walls of each brush mounting box need not be necessarily be rectangular as illustrated, but also can take other forms as long as they expose a sufficient amount of the sides of the brushes to aid in dissipating heat. It is also readily apparent that the principles of the present invention may be applied to motors of various sizes as well as to brushes of various dimensions and shapes.

Various modes in carrying out the invention are contemplated as being within the scope of the following claims, particularly pointing out and distinctly claiming the subject matter which is regarded as the invention.

I claim:

1. A one-piece end bell and brush holder for a dynamoelectric machine having a rotor with a shaft and a drum-like commutator secured to the shaft, comprising:
   an annular cup-shaped cap member molded of electrical insulating material that includes a central axis with a base extending radially therefrom and a central opening formed therethrough at said axis for receiving the shaft of said machine, and a circumferential outer wall extending axially from one side of said base to be concentric with said central opening, said cap member having circumferentially spaced apart radially elongated mounting boxes for slidably confining the brushes of said machine disposed on said one side of said base, each brush mounting box being open at axially opposite ends, said axial opening extending through the base of said cap member to expose at least a portion of the bottom face of a brush directly to the atmosphere, and includes, a pair of opposing, spaced apart side walls extending radially along said one side of said base and extending axially therefrom to contain a brush against circumferential displacement, an end wall extending between the radially outer ends of said side walls, a flange on the axially outer edge of at least one of said side walls projecting circumferentially to partially enclose the axial opening along the top of said brush mounting box and to form a radially extending slot, said flange containing said brush against axial movement in one direction, and a stop member located between said side walls which defines the axial opening in the bottom of said brush mounting box, said stop member in contacting engagement with said brush to contain said brush against axial movement in the other direction, whereby the side walls, flange and stop member of each box cooperate to provide guide ways opening radially inwardly in which the brushes of said machine are lengthwise and slidably received.

2. The one-piece end bell and brush holder of claim 1 wherein each of the side walls of said brush mounting boxes includes a vent opening formed therethrough which communicates with said axial opening to expose the side faces of a brush directly to the atmosphere.

3. The one-piece end bell and brush holder of claim 1 wherein the end wall of each brush mounting box is formed by the outer wall of said cap member.

4. The one-piece end bell and brush holder of claim 1 wherein a circumferentially extending notch is formed in each of said brush mounting boxes at the radially outer ends of said side walls and the axially outer end of said end wall.

5. The one-piece end bell and brush holder of claim 1 wherein the outer wall of said cap member is interrupted at diametrically opposite positions, each interruption being disposed between a pair of adjacent brush mounting boxes and radially extending lands projecting axially from said one side of said base in positions which coincide with said interruptions for reinforcing the legs of U-shaped terminals to be mounted on said cap member about its outer edge.

6. A one-piece end bell and brush holder for a dynamoelectric machine having a rotor with a shaft and a drum-like commutator secured to the shaft, comprising:

an annular cup-shaped cap member molded of electrical insulating material that includes a central axis with a base extending radially therefrom and a central opening formed therethrough at said axis for receiving the shaft of said machine, a circumferential outer wall extending axially from one side of said base to be concentric with said central opening, and a circular inner wall located between said central opening and said outer wall and concentric therewith, said inner wall projecting axially from said one side of said base a sufficient distance to encompass the commutator of said machine and having circumferentially spaced apart openings formed therethrough at equispaced locations, said cap member having circumferentially spaced apart radially elongated mounting boxes for slidably confining the brushes of said machine disposed on said one side of said base and in radial alignment with the openings in said inner wall, each brush mounting box being open at axially opposite ends, said axial opening extending through the base of said cap member to expose at least a portion of the bottom face of a brush directly to the atmosphere, and includes, a pair of opposing, spaced apart side walls located adjacent to and embracing the opening in said inner wall, said side walls extending radially along said one side of said base from said inner wall to said outer wall and extending axially therefrom to contain a brush against circumferential displacement, an end wall extending between the radially outer ends of said side walls, said end wall formed by the outer wall of said cap member, flanges on the axially outer edges of said side walls projecting circumferentially toward each other to partially enclose the axial opening along the top of said brush mounting box and to form a radially extending slot, said flanges containing said brush against axial movement in one direction, and a radially extending, elongated stop member located between said side walls and spaced therefrom, said stop member bridging the axial opening along the bottom of said brush mounting box and in contacting engagement with said brush to contain said brush against axial movement in the other direction, whereby the side walls, flanges, and stop member of each box cooperate to provide guideways opening radially inwardly through the openings in the inner wall of said cap member in which the brushes of said machine are lengthwise slidably received.

7. The one-piece end bell and brush holder of claim 6 wherein each of the side walls of said brush mounting boxes includes a vent opening formed therethrough which communicates with said axial opening to expose the side faces of a brush directly to the atmosphere.

8. The one-piece end bell and brush holder of claim 6 wherein a circumferentially extending notch is formed in each of said brush mounting boxes at the radially outer ends of said side walls and the axially outer end of said end wall.

9. The one-piece end bell and brush holder of claim 6 wherein the side walls of a said brush mounting boxes extend axially from said one side of said base further than said outer wall, and the end wall of each box includes a projection extending axially from said outer wall.

10. In combination, a dynamoelectric machine having a cylindrical housing enclosing a rotor with a shaft and a drum-like commutator secured to the shaft that is adapted to be contacted by electric current carrying brushes, and a one-piece end bell and brush holder for supporting and guiding the brushes of said machine for radial movement relative to said commutator and for enclosing the commutator end of said machine housing, said one-piece end bell and brush holder comprising:

an annular cup-shaped cap member molded of electrical insulating material that includes a central axis with a base extending radially therefrom and a central opening formed therethrough at said axis for receiving the shaft of said machine, a circumferential outer wall extending axially from one side of said base to be concentric with said central opening, and a circular inner wall located between said central opening and said outer wall and concentric therewith, said inner wall projecting axially from said one side of said base a sufficient distance to encompass the commutator of said machine and having circumferentially spaced apart openings formed therethrough, said cap member having circumferentially spaced apart radially elongated mounting boxes for slidably confining the brushes of said machine disposed on said one side of said base and in radial alignment with the openings in said inner wall, each brush mounting box being open at axially opposite ends, said axial opening extending through the base of said cap member to expose at least a portion of the bottom face of a brush directly to the atmosphere, and includes, a pair of opposing, spaced apart side walls located adjacent to and embracing the opening in said inner wall, said side walls extending radially along said one side of said base from said inner wall to said outer wall and extending axially therefrom to contain a brush against circumferential displacement, an end wall extending between the radially outer ends of said side walls, said end wall formed by the outer wall of said cap member, flanges on the axially outer edges of said side walls projecting circumferentially toward each other to partially enclose the axial opening along the top of said brush mounting box and to form a radially extending slot, said flanges containing said brush against axial movement in one direction, and a radially extending, elongated stop member located between said side walls and spaced therefrom, said stop member bridging the axial opening along the bottom of said brush mounting box, said stop member in contacting engagement with said brush to contain said brush against axial movement in the other direction, whereby the side walls, flanges, and stop member of each box cooperate to provide guideways opening radially inwardly through the openings in the inner wall of said cap member in which the brushes of said machine are lengthwise slidably received, an electric current carrying brush mounted in each of said brush mounting boxes, spring means located within each box between the end wall thereof and its respective brush for biasing said brushes radially inwardly into engagement with the commutator of said machine, grounded and current carrying terminals connected by shunt wires to said brushes, and means for securing said cap member to said housing.

11. The combination of claim 10 wherein the outer wall of said cap member is interrupted at diametrically opposite positions, each interruption being disposed between a pair of adjacent brush mounting boxes; lands disposed on said one side of said projecting axially from said base in positions coinciding with said interruptions and extending radially therethrough; and said grounded terminals are U-shaped and are disposed so that the legs of said U-shaped terminals straddle the outer edge of said cap member at said landings.

12. The combination of claim 11 wherein said securing means includes a bolt extending through axially aligned bores in at least one land and the legs of a corresponding U-shaped terminal, said bolt contacts both said terminal and said machine housing to provide a ground for said terminal.

13. The combination of claim 10 wherein said outer wall is recessed from the outer edge of said base to permit interfitting engagement with the cylindrical housing of said machine.

14. The combination of claim 10 wherein said cap member further includes means for facilitating the proper alignment of said cap member on the commutator end of said machine housing, said means comprising a key member extending radially from the outer edge of said base.

15. The combination of claim 10 wherein each of the side walls of said brush mounting boxes includes a vent opening formed therethrough which communicates with said axial opening to expose the side faces of a brush directly to the atmosphere.

16. The combination of claim 10 wherein a circumferentially extending notch is formed in each of said brush mounting boxes at the radially outer ends of said side walls and the axially outer end of said end wall, said notches receive and retain said shunt wires at a position remote from said commutator during assembly of said cap member to said machine housing.

* * * * *